(12) United States Patent
Aridor et al.

(10) Patent No.: US 8,302,091 B2
(45) Date of Patent: Oct. 30, 2012

(54) INSTALLATION OF A BOOTABLE IMAGE FOR MODIFYING THE OPERATIONAL ENVIRONMENT OF A COMPUTING SYSTEM

(75) Inventors: Yariv Aridor, Zichron-Yaakov (IL); Alex Glikson, Haifa (IL); Oleg Goldshmidt, Herzeliya (IL); Benny Rochwerger, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 11/422,099

(22) Filed: Jun. 5, 2006

(65) Prior Publication Data

US 2007/0283343 A1    Dec. 6, 2007

(51) Int. Cl.
  *G06F 9/445* (2006.01)
(52) U.S. Cl. ....................................... 717/174
(58) Field of Classification Search ............. 717/174
  See application file for complete search history.

(56) References Cited

U.S. PATENT DOCUMENTS

| | | | |
|---|---|---|---|
| 6,317,826 B1 * | 11/2001 | McCall et al. | 713/1 |
| 6,421,777 B1 * | 7/2002 | Pierre-Louis et al. | 713/2 |
| 6,795,912 B1 * | 9/2004 | Itoh et al. | 713/2 |
| 7,356,679 B1 * | 4/2008 | Le et al. | 713/1 |
| 2003/0126242 A1 * | 7/2003 | Chang | 709/222 |
| 2005/0010647 A1 | 1/2005 | Durham | |
| 2005/0050539 A1 | 3/2005 | Burkhardt et al. | |
| 2005/0052921 A1 * | 3/2005 | Butterworth et al. | 365/222 |
| 2005/0160420 A1 | 7/2005 | Kruta et al. | |

FOREIGN PATENT DOCUMENTS

WO    WO 2005055072 A1 *    6/2005

* cited by examiner

*Primary Examiner* — Wei Zhen
*Assistant Examiner* — Lanny Ung
(74) *Attorney, Agent, or Firm* — F. Jason Far-hadian; Century IP Group

(57) ABSTRACT

Systems and methods for remotely installing software on a computing system while the computing system is running on a first bootable image, so that the computing system is not removed from operation during the installation of a second bootable image. The method comprises constructing the second bootable image on a storage medium accessible to the computing system while the computing system is operating in a first operating environment in association with the first bootable image, customizing the second bootable image so that the computing system can operate in a second operating environment in association with the second bootable image, disassociating the computing system from the first bootable image, and associating the computing system with the second bootable image.

20 Claims, 5 Drawing Sheets

INSTALLATION OF A BOOTABLE IMAGE FOR MODIFYING THE OPERATIONAL ENVIRONMENT OF A COMPUTING SYSTEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to installation of software and, more particularly, to a system and method for installing bootable images for client systems in a computer network.

BACKGROUND

Referring to FIG. 1A, typically, installation media 30 such as compact disks (CDs) or floppy disks are utilized to install a software application on one or more computing systems 10. The user inserts installation media 30 into a computing system 10A and goes through an installation procedure that copies an installable image of the software from installation media 30 to the computing system 10.

An installable image usually consists of one or more self-extracting application files stored on installation media 30 in compressed form. Once the files are copied to computing system 10A, the user runs an executable file (e.g., a setup program) to decompress and extract the files from the installable image into the appropriate folders and to make the necessary modifications to certain system files (e.g., registry files). Thereafter, the computing system 10A is rebooted for the changes to take effect.

If the software is to be installed on other computing systems, then the above installation process must be repeated for each computing system (e.g., computing systems 10B, 10C and 10D). Further, depending on the computing system's operating environment (e.g., hardware/software platform, operating system, the connected devices, etc.), it is typically necessary for the installation process to be customized for each computing system. Therefore, the user may have to manually input different information for each system to customize the installation for that system.

As such, installing the same software on multiple computing systems (e.g., 10A, 10B, 10C, 10D) can be rather time consuming as a user will have to go through the install, customization and reboot procedures for every single computing system. The problem is further exacerbated if more than one software application needs to be installed on each computing system. Unfortunately, the downtime associated with the installation of multiple software on several computers is a drain on both human resources and productivity of an organization.

Referring to FIG. 1B, in a networked environment, client systems 15 are connected to a server 20. In this environment, if all client systems 15 require installation of the same software—comprising either a single software product or a group of software products—an installable image 40 can be customized for that purpose and the same image can be copied to all client systems 15 and used to install the software. Unfortunately, this installation approach makes each client system 15 unavailable during the installation process, as well, as each client system 15 will have to be used to run the setup program to install the files in the installable image and then each client system 15 has to be rebooted for the changes to take effect.

Even though installing the software from the installable image 40 is faster than installing the software from installation media 30 on several client systems 15, the installation procedure remains inconvenient and time consuming. Further, if the installable image 40 has to be copied to client systems 15 that have different or frequently changing operating environments, additional customization is required on each client system 15 to ensure that the installed software properly functions in all different operating environments.

For example, further customization may be required to change specific parameter values (e.g., hostnames, static IP addresses, users, groups, etc.), identify services to be provided on startup, select appropriate device drivers, and to provide specific device configuration parameters for each client system 15. Also, depending on the client system's software or hardware environment, some customization may be necessary immediately upon installation, and additional customization may be needed when a new hardware or software component is added.

As shown, custom installable images may be stored in server 20 for client systems 15 that have different operating environments. For example, a first installable image can be used for installing a software image on Linux™ machines, and a second installable image can be used for installing the same software image on Microsoft Windows™ machines. In this manner, certain custom parameters and properties can be embedded in the installable image.

Unfortunately, even the above approach requires the removal of the target system from operation during the course of installation and customization. Further, the customizations have to be performed either manually or with the help of custom programs or scripts that have to be executed on each target system or a replica of the target system. Even further, the target machines often have to be rebooted more than once before the changes are effective. In a large organization, the installation procedure can become overly cumbersome, time consuming, error prone and resource intensive.

Methods and systems are needed that can overcome the aforementioned shortcomings by simplifying the installation process in a way that it can be centrally controlled without the requirement for removing the target systems from operation during the installation process.

SUMMARY

The present disclosure is directed to a system and corresponding methods for installing a bootable image on a computing system so that the client system is not removed from operation during the installation process.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for installing a bootable image on a computing system comprising, for example, a virtual machine or a physical machine is provided. The method includes constructing a second bootable image on a storage medium accessible by the computing system, while the computing system is operating in a first operating environment in association with a first bootable image.

In one embodiment, the method further includes customizing the second bootable image so that the computing system can operate in a second operating environment in association with the second bootable image. The computing system is then disassociated from the first bootable image, and the computing system is associated with the second bootable image.

The constructing, customizing, disassociating, and associating are performed by at least one centralized server computer remotely coupled to the computing system and the storage medium such that the computing system does not perform the copying, customizing, disassociating, and associating. The terms "coupled" or "connected" herein denote a physical or logical connection or relationship between two systems that are capable of communicating over a local or remote data network.

In another embodiment, the second bootable image is constructed from a master bootable image that may be further customized to provide for the computing system to operate in the second operating environment. In yet another embodiment, the second bootable image is constructed from the bootable image from which the computing system was booted initially. The customizing may comprise modifying the second bootable image so that the computing system loads a second operating system to operate in the second operating environment, in response to booting from the second bootable image.

In certain embodiments, the customizing includes modifying the second bootable image so that the second operating environment supports access to a second set of network resources, in response to booting from the second bootable image, wherein the second set of network resources is different from a first set of network resources supported in the first operating environment.

In another embodiment, the customizing includes modifying the second bootable image so that the computing system operates over a second hardware platform, in response to booting from the second bootable image. In yet another embodiment, the customizing includes modifying the second bootable image so that the computing system operates over a second software platform, in response to booting from the second bootable image.

In some embodiments, the customizing includes modifying the second bootable image so that the computing system supports connection to new or different network recourses, in response to booting from the second bootable image. The second bootable image may be retrieved from a backup image repository, for example, or is an image active on a different computing system. In one or more embodiments, the disassociating and the associating are implemented by configuring a network connection established between the computing system and the storage medium.

In other exemplary embodiments, a system or computer program product comprising a computer useable medium having a computer readable program is provided, wherein the system or the computer readable program, when executed on a computer causes the computer to, perform the operations noted above.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

The present disclosure is directed to systems and corresponding methods that facilitate installation of a bootable image to a computing system without requiring the computing system to perform the installation process.

In accordance with one aspect of the invention, to allow a target system to operate in a new operating environment, instead of creating an installable image, a bootable image is constructed and customized by a server for the target system. The target system continues to operate in the old operating environment associated with the old bootable image while the server creates the new bootable image. After the new bootable image is created, the server associates the target system with the new bootable image, and causes the target system to be rebooted from the new bootable image.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1A:
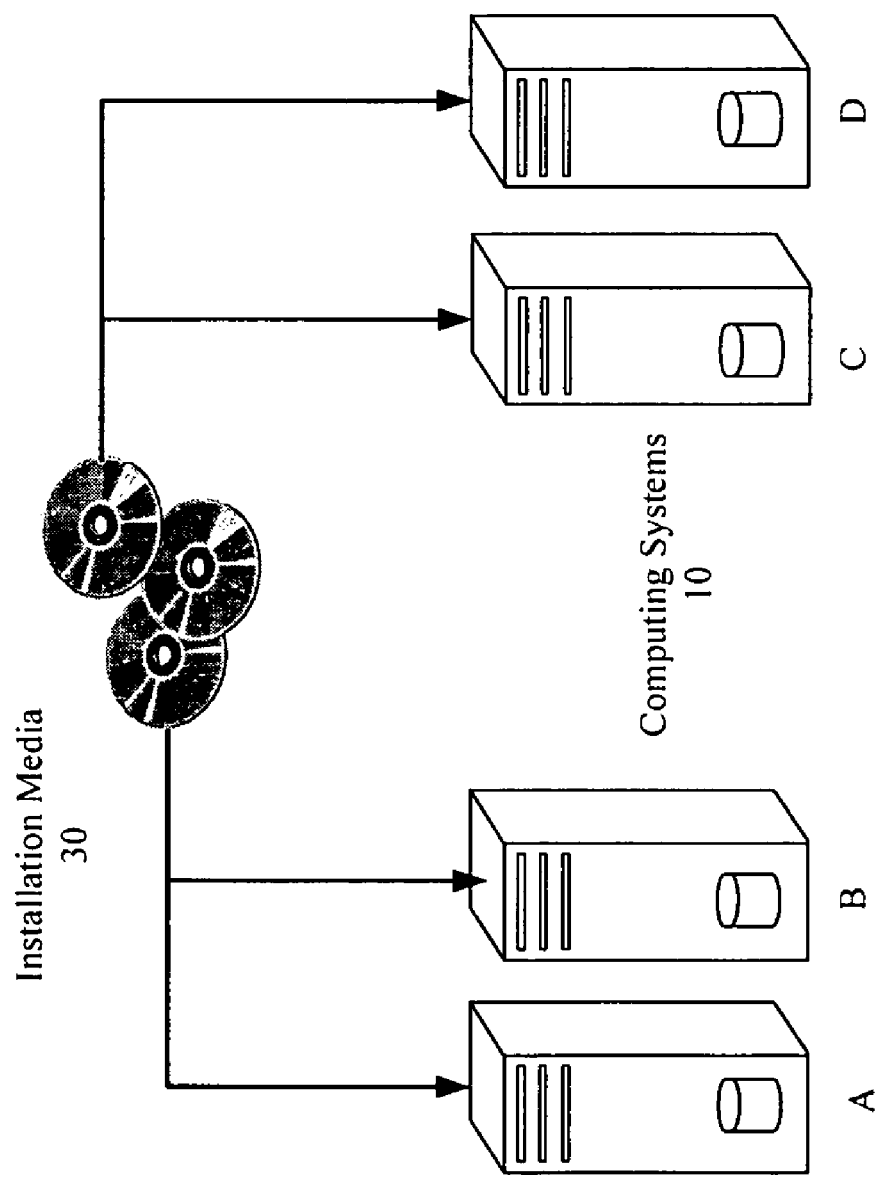
FIG. 1A illustrates a plurality of computing systems on which software may be installed, using installation media containing the code for the software.
Figure 1B:
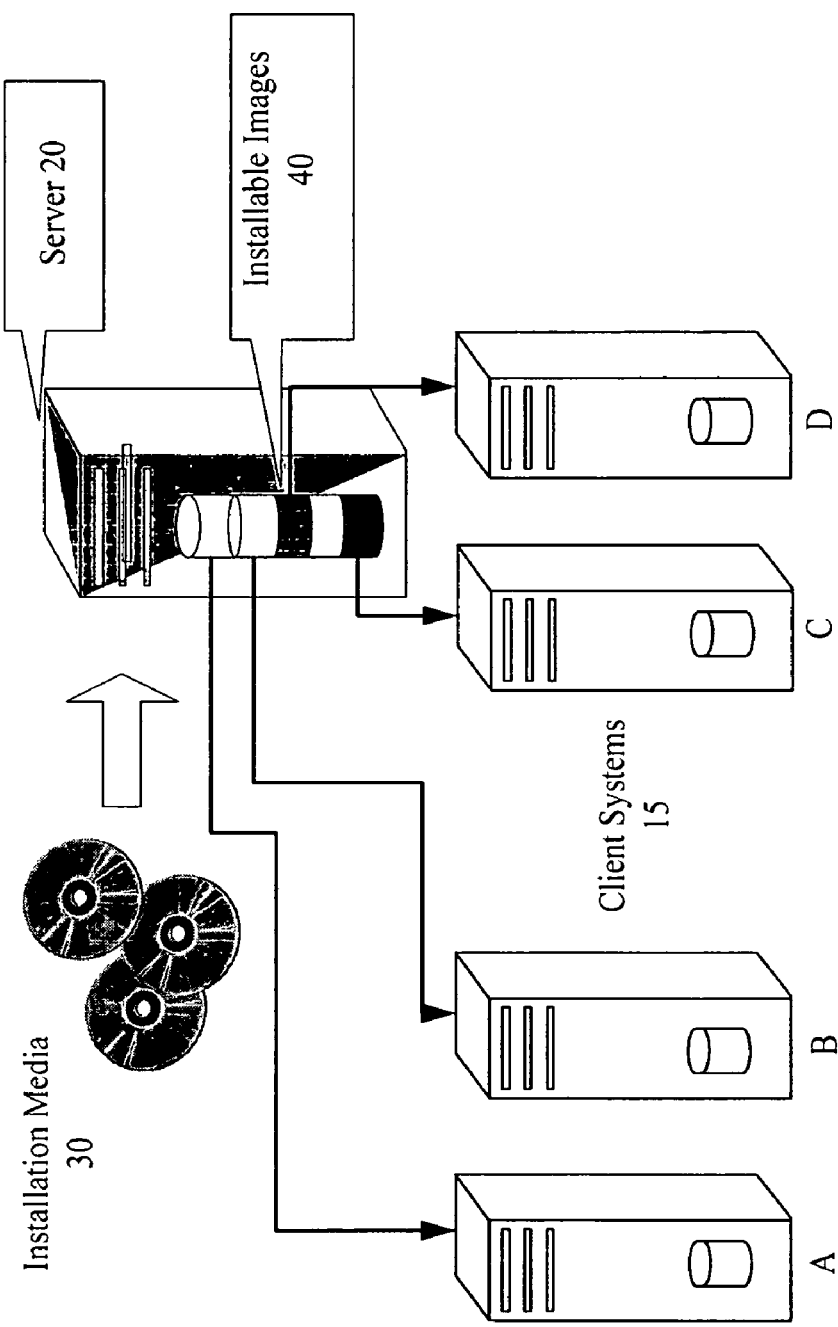
FIG. 1B illustrates a plurality of computing systems on which software may be installed by way of a server system containing the code for the software.
Figure 2:
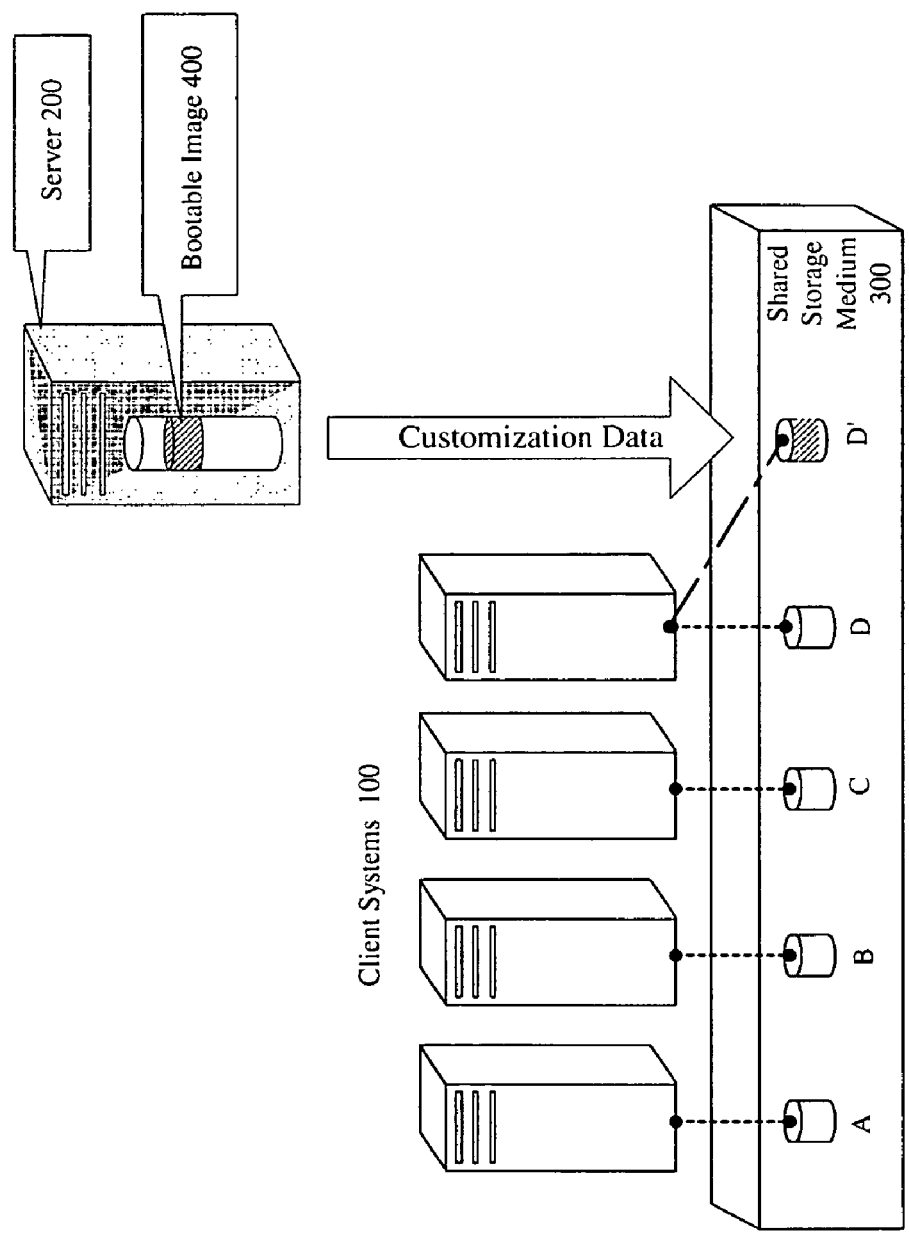
FIG. 2 illustrates a plurality of computing systems connected to a distributed network environment, wherein a centralized server is used to customize software for use by each computing system, in accordance with one aspect of the invention.

Referring to FIG. 2, in a preferred embodiment, a server 200 is connected in a distributed environment to one or more client systems 100 and a shared storage medium 300. Server 200 may be a mainframe machine, a personal computer or any other computing system that can be used to service client systems' 100 requests submitted over a data network (not shown). Client systems 100 can comprise physical or virtual machines that communicate with server 200 to directly or indirectly access shared storage medium 300 and other hardware resources.

Client systems 100 can comprise physical machines that access hardware resources directly, or virtual machines that access some or all of the hardware resources via a hosting system or a hypervisor, for example. Shared storage medium 300 may be any type of network storage medium. In some embodiments, shared storage medium 300 is a network drive coupled or connected to both server 200 and client systems 100 in a distributed environment, so that shared storage medium 300 is accessible by client systems 100 and server 200. In other embodiments, storage medium 300 may be a local disk of either a hosting system or a hypervisor that is accessible by different virtual machines.

The connection between client systems 100 and server 200 may be established over wired or wireless communication networks, for example. In one embodiment, shared storage medium 300 is a storage area network (SAN) that connects computer storage devices such as disk array controllers, optical libraries or tape libraries to server 200 (e.g., based on Ethernet or Fiber Channel infrastructure, and using either block-level (SAN) or file-level (NAS) access).

In yet another embodiment, shared storage medium 300 may be connected to client system 15 in a distributed network via server 200 in a wired or wireless environment. Shared storage medium 300 may be connected to server 200 and client systems 100 via other communication means without departing from the principals disclosed herein. As shown, shared storage medium 300 may comprise multiple storage volumes.

A storage volume can be either a physical storage unit (e.g., a hard drive) or a logical storage unit, which is a part of one physical storage unit or one that spans several physical storage units. For the purpose of this disclosure, multiple storage volumes A, B, C and D are illustrated as a part of a shared storage medium 300 by way of example and without limiting the scope of the invention to this particular exemplary embodiment.

Each storage volume may comprise a file system that is associated with a client system 100. For the purposes of this disclosure the term "association" as used here refers to a logical or physical link that allows a remote file or file system (e.g., located on server 200 or shared storage medium 300) to be available for access by a client system 100. This linking process is sometimes also referred to as mounting or mapping depending on the type of data structure involved.

In one embodiment, mounting refers to the process of making shared storage medium 300, or each storage volume that comprises the bootable image, physically accessible to client system 100 for boot purposes. In this manner, the each volume becomes accessible as a local disk drive (e.g., block device) to client system 100 or server 200. In another embodiment, volume A is the storage unit on which a file system associated with a first client system 100A is stored. The file system in an exemplary embodiment may include a bootable image from which client system 100A is booted each time client computer 100A is turned on, for example.

The bootable image comprises the sequence of bits that interface with the client system's operating environment. The operating environment may be defined by the hardware and software platforms associated with a client system 100, and/or available resources and devices connected to or installed on client system 100. In an exemplary embodiment, the operating environment of client system 100A is defined by the system's hardware, operating system, utilities and diagnostics, as well as boot and data recovery information stored in storage volume A.

The operating environment for each client system 100 may be specific to certain parameter values (e.g., hostnames, static IP addresses, users, groups, etc.), and services to be provided on startup. For example, the device drivers and configuration parameters for client system 100A may be different from client system 100B, if client system 100A is a machine that runs the Linux™ operating system and client system 100B is a machine that runs Microsoft Windows™ operating system.

As another example, if a tape drive is physically moved from client system 100A to client system 100B, certain settings for client system 100B may have to be changed for it to recognize the new tape drive. Therefore, the bootable image stored in volume B for client system 100B needs to be updated to provide a new operating environment suitable for the new tape drive.

In accordance with one aspect of the invention, instead of disassociating client system 100B from the old bootable image stored on volume B, and using client system 100B to install and customize a new operating environment, client system 100B remains associated to the old bootable image and continues to operate in the old operating environment until server 200 customizes a new bootable image that may be used to provide the new operating environment for client system 100B. Thus the new operating environment may include a new hardware platform, operating system, middleware or application, as well as newly established environmental settings, network settings, storage settings, and application clustering settings, for example.

The above process may be accomplished based on the observation that customization of a target system may be performed by a separate server 200 on the shared storage medium 300 without the requirement of having the target system perform the installation from an installable image. Instead, a networked server 200 may modify the bootable image's constituent file system by way of file replacement, file creation and file modification, for example.

Accordingly, in one embodiment, server 200 can access the contents of a bootable image associated with the target system and customize the respective files for file systems. The customization process may include mounting or mapping the related volumes and modifying their contents. Further, configuration parameters for the target system may be modified by creating, replacing or modifying the relevant configuration files.

The above approach may effectively replace the conventional and cumbersome installation scheme with an automated process that enables server 200 to modify the bootable image for a target system, such that the modified bootable image includes the file system and the constituent configuration data to provide a new operating environment for the target system. Using this approach, the target system itself need not be used to install an entirely new file system from an installable image. Thus, the target system can continue to operate in the old operating environment until the new bootable image is prepared by server 200.

As shown in FIG. 2, in accordance with one embodiment, a bootable image 400 is stored on server 200, or alternatively on a storage medium accessible by server 200 or client systems 100. For example, bootable image 400 may be stored in a repository of a hosting system (e.g., files in a file system), such that both client systems 100 and server 200 are virtual systems on the hosting system. In one embodiment, bootable image 400 is created from, for example, a master bootable image that is adjusted for multiple cloning of the image, and retrieved from an image repository, In another embodiment, bootable image 400 is captured from an image active on client system 100 itself, or is a newly created image specially customized for client system 100, without client system 100 being physically involved. The bootable image 400 may include the sequence of bits to be stored on a boot device (e.g., volume A) that interfaces with the target computer's hardware. Bootable image 400 may also include the operating system, utilities and diagnostics, as well as boot and data recovery information.

In certain embodiments, bootable image 400 does not contain critical data specific to a certain type of client system 100 or specific operating environment. Bootable image 400 may include uncustomized data that is reproducible from configuration files or off-the-shelf executable files, for example. Thus, end user data and environment specific data (i.e., custom data) for a particular user or system are not included in bootable image 400, in accordance with one or more embodiments.

Additionally, bootable image 400 does not have to reside on server 200 at all times. Server 200 can select the bootable image from a backup library of bootable images, such as an optical compact disc library or a tape library. Thus, in one embodiment, server 200 can access the bootable image at the time of installation as a clean template for all client systems 100, and later customize each bootable image for each particular client system 100.

Figure 3:
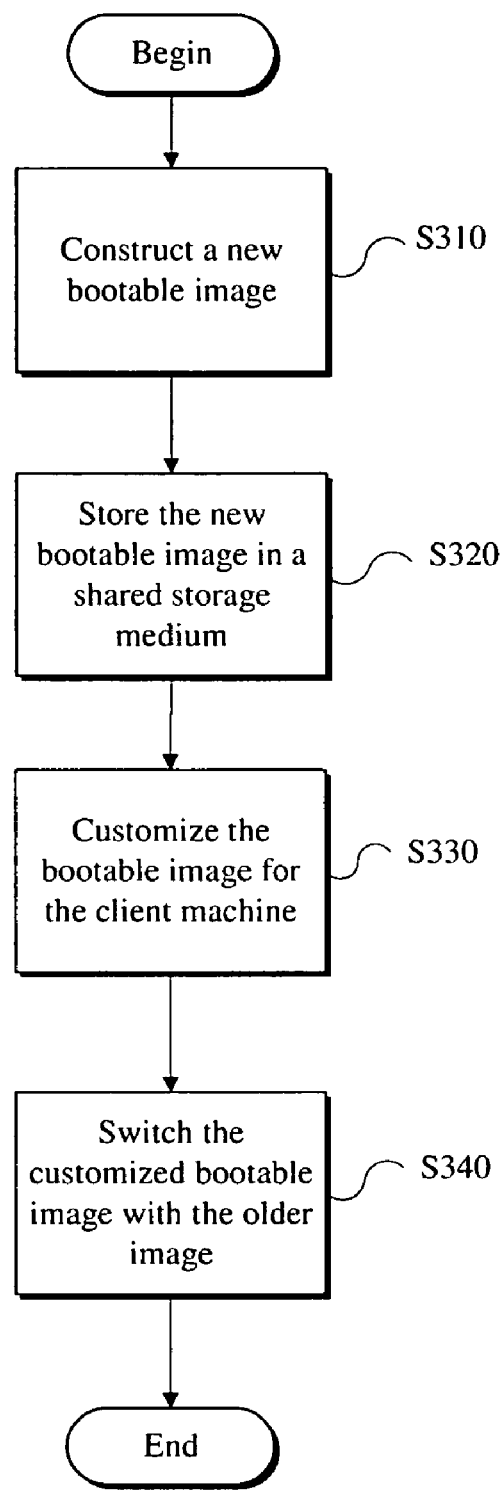
FIG. 3 is a flow diagram of a method of installing a custom bootable image for one or more computers connected to a distributed network environment, in accordance with a preferred embodiment.

Referring to FIG. 3, in accordance with one aspect of the invention, when a target system's old bootable image is to be upgraded or replaced, server 200 constructs a new bootable image 400 for the target system (S310). As noted above, various bootable images 400 may exist for target systems in different operation environments. For example, a first bootable image 400 may exist for target systems that run Linux™ as an operating system, and a second bootable image 400 may exist for target systems that run Microsoft Windows™.

New bootable image 400 may be stored on shared storage medium 300, server 200 or any other storage medium accessible by server 200 (S320). The new bootable image 400, in one embodiment, may be also stored in the target system itself. By way of example, if client system 100D is the target system, bootable image 400 may be copied by server 200 to a storage volume D' and customized for client system 100D (S330).

The new bootable image 400 may be constructed by way of byte-to-byte copying, or by any other method that creates an accessible copy of bootable image 400, either in physical or logical form. For example, a copy can be created instantly by using a snapshot mechanism (e.g., FlashCopy) or a copy-on-write mechanism. In this manner, the customization is completed off-line, without interfering with the operation of the target system. This means that the configuration of the operation system and the applications on the target image is performed when they are not loaded in memory.

The customization may include the process of determining the needed components for activating or deactivating system settings and thereafter configuring the runtime parameters for client system 100D at the file level. Server 200 is given access to a database that contains information about the needed components and configurations for each target system and the corresponding operating environment.

In certain embodiments, the customization process is fully or partially automated as the parameters needed for customization can be collected from a database, or alternatively generated according to a set of policies and algorithms that are available to server 200. Once the customization of boot image 400 is completed, server 200 switches the customized bootable image with the old bootable image used by the target system (S340).

The switching process, in effect, disassociates (e.g., dismounts) the target system from the old bootable image and associates (e.g., mounts) the target system on the new customized bootable image. In certain embodiments, the association and disassociation procedures are performed by configuring the network connection between client systems 100 and shared storage medium 300 or by configuring shared storage medium 300 or repository where the bootable image 400 is stored.

Referring back to FIG. 2, in an exemplary embodiment, server 200 comprises a physical or virtual machine that is capable of switching the new bootable image with the old bootable image by, for example, causing client system 100D to be mounted or mapped to storage volume D' (e.g., the volume comprising the customized bootable image 400) instead of storage volume D (e.g., the volume comprising the old bootable image). Once the images are switched, client system 100D is rebooted so that the new operating environment for client system 100D can be created.

In another exemplary embodiment, storage volume D is located on client system 100D. Server 200 copies storage volume D' locally to client system 100D. Server 200 then disassociates client system 100D from storage volume D, and associates client system 100D to storage volume D'. Once the association is created between client system 100D and storage volume D', client system 100D is rebooted with the new operating environment. Server 200 can then delete old storage volume D, leave old storage volume D on client system 100D, or archive storage volume D on another shared storage medium as a restoration point.

In an alternative embodiment, server 200 may be implemented to make a copy of the old bootable image for a client system 100, instead of copying a master bootable image 400. In this embodiment, server 200 strips all customization from the old bootable image to effectively create an equivalent of the master bootable image. This equivalent image is then customized as discussed above to create the new bootable image.

According to the above, server 200 advantageously creates, replaces or modifies files in a files system of a bootable image in response to specifications provided to server 200. The specification include information about the files in the file system that are to be modified, replaced or deleted in order to create a new operating environment for a target system. In one embodiment, more than one target system at a time may be updated as server 200 can customize multiple bootable images at the same time. Advantageously, server 200 need not be rebooted between customizations and therefore the process can be performed efficiently.

In one embodiment, an administrator keeps track of the operating systems for different client systems 100 in the network, and the type of machine that operating systems are installed on. Server 200 can preferably create a log for storing the properties of the old bootable images and the new bootable images, so that the administrator can easily update their records from server 200 and provide a restore point for each client system 100 in case of a failure or problem with the new bootable images.

As such, server 200 can archive the first bootable image for later retrieval, so that changes can be undone back to the restore point. The bootable image can be kept on the shared storage medium 300, so that if a user wants to restore the old operating environment, server 200 can disassociate the new bootable image and reassociate the old bootable image. Alternatively, the bootable image can be moved to a backup storage medium, such as a disk array, an optical library or a tape library.

In different embodiments, the invention can be implemented either entirely in the form of hardware or entirely in the form of software, or a combination of both hardware and software elements. For example, server 200 may comprise a controlled computing system environment that can be presented largely in terms of hardware components and software code executed to perform processes that achieve the results contemplated by the system of the present invention.

Figure 4A:
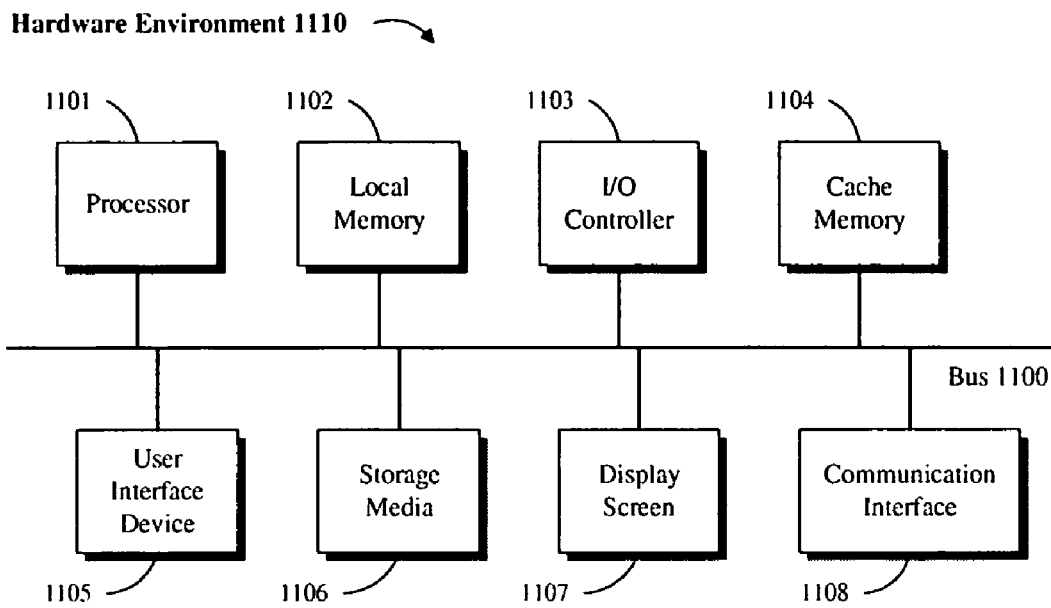
FIGS. 4A and 4B are block diagrams of hardware and software environments in which a system of the present invention may operate, in accordance with one or more embodiments.
Figure 4B:
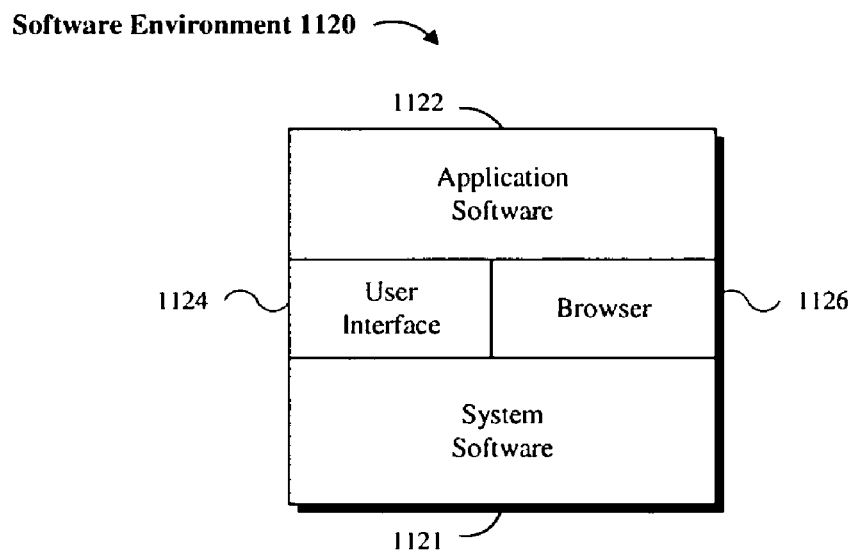

Referring to FIGS. 4A and 4B, a computing system environment in accordance with an exemplary embodiment comprises a hardware environment 1110 and a software environment 1120. The hardware environment 1110 comprises machinery and equipment that provide an execution environment for the software; and the software provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In a preferred embodiment, a customization software is implemented as application software 1122 executed on server 200 or one or more hardware environments to perform the process of customizing a bootable image, as provided earlier. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on client system's 100 and server software is executed on server 200.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention and are further defined by the claims and their full scope of equivalents.

What is claimed is:

1. A method of booting a computing system, the method comprising:

constructing a second bootable image on a storage medium remotely accessible by the computing system, using a server computer, while the computing system is operating in a first operating environment in association with a first bootable image, wherein the storage medium is not local to the server computer such that the second bootable image is constructed on the storage medium without the second bootable image having to be downloaded from a storage medium local to the server computer onto the storage medium remotely accessible by the computing system;

customizing the second bootable image, without using the resources of the computing system, so that the computing system can operate in a second operating environment in association with the second bootable image, when the computing system is directly booted from the second bootable image stored on the remotely accessible storage medium which is sharable with other computing systems;

disassociating the computing system from the first bootable image; and associating the computing system with the second bootable image stored on the remotely accessible storage medium, wherein the constructing, customizing, disassociating and associating are performed by the server computer remotely coupled to the computing system and the storage medium such that the computing system does not perform the constructing, customizing, disassociating and associating so that the customizing is performed by the centralized server without interfering with ongoing operation and functionality of the computing system booted from the first bootable image, while the second bootable image is being constructed, wherein the constructing of the second bootable image is accomplished, without powering down the computing system, by way of at least one of file replacement, file creation, and file modification of constituent file system of the first bootable image for the purpose of activating or deactivating system settings and thereafter configuring runtime parameters associated with the computing system such that the second bootable image includes a file system and constituent configuration data to provide a new operating environment for the computing system, and wherein the disassociating comprises dismounting the computing system from the first bootable image and the associating comprises mounting the computing system on the second bootable image.

2. The method of claim 1, wherein the customizing comprises modifying the second bootable image so that the computing system loads a second operating system to operate in the second operating environment, in response to booting from the second bootable image.

3. The method of claim 1, wherein the customizing comprises modifying the second bootable image so that the computing system operates over a second hardware platform in the second operating environment, in response to booting from the second bootable image.

4. The method of claim 1, wherein the customizing comprises modifying the second bootable image so that the computing system operates over a second software platform in the second operating environment, in response to booting from the second bootable image.

5. The method of claim 1, wherein the customizing comprises modifying the second bootable image so that the second operating environment supports access to a second set of network resources, in response to booting from the second bootable image, wherein the second set of network resources is different from a first set of network resources supported in the first operating environment.

6. The method of claim 1, wherein the second bootable image is copied from a master bootable image that is customized to cause the computing system to operate in the second operating environment.

7. The method of claim 1, wherein the second bootable image is retrieved from a backup image repository.

8. The method of claim 1, wherein the second bootable image is captured from an image active on a different computing system.

9. The method of claim 1, wherein the disassociating and the associating are implemented by configuring a network connection established between the computing system and the storage medium.

10. The method of claim 1, wherein the computing system comprises a physical machine.

11. The method of claim 1, wherein the computing system comprises a virtual machine.

12. A system for booting a computing system, the system comprising:

a logic unit for constructing a second bootable image on a storage medium remotely accessible by the computing system, using a server computer, while the computing system is operating in a first operating environment in association with a first bootable image, wherein the storage medium is not local to the server computer such that the second bootable image is constructed on the storage medium without the second bootable image having to be downloaded from a storage medium local to the server computer onto the storage medium remotely accessible by the computing system;

a logic unit for customizing the second bootable image, without using the resources of the computing system, so that the computing system can operate in a second operating environment in association with the second bootable image, when the computing system is directly booted from the second bootable image stored on the remotely accessible storage medium which is sharable with other computing systems;

a logic unit for disassociating the computing system from the first bootable image;

and a logic unit for associating the computing system with the second bootable image stored on the remotely accessible storage medium, wherein the constructing, customizing, disassociating and associating are performed by the server computer remotely coupled to the computing system and the storage medium such that the computing system does not perform the constructing, customizing, disassociating and associating so that the customizing is performed by the centralized server without interfering with ongoing operation and functionality of the computing system booted from the first bootable image, while the second bootable image is being constructed, wherein the constructing of the second bootable image is accomplished, without powering down the computing system, by way of at least one of file replacement, file creation, and file modification of constituent file system of the first bootable image for the purpose of activating or deactivating system settings and thereafter configuring runtime parameters associated with the computing system such that the second bootable image includes a file system and constituent configuration data to provide a new operating environment for the computing system, and wherein the disassociating comprises dismounting the computing system from the first bootable image and the associating comprises mounting the computing system on the second bootable image.

13. The system of claim 12, wherein the computing system comprises at least one of a physical machine and a virtual machine.

14. The system of claim 12, wherein the computing system loads a second operating system to operate in the second operating environment, in response to booting from the second bootable image.

15. The system of claim 12, wherein the computing system operates over a second hardware platform in the second operating environment, in response to booting from the second bootable image.

16. The system of claim 12, wherein the computing system operates over a second software platform in the second operating environment, in response to booting from the second bootable image.

17. The system of claim 12, wherein the second operating environment supports access to a second set of network resources, in response to booting from the second bootable image, wherein the second set of network resources is different from a first set of network resources supported in the first operating environment.

18. A computer program product comprising a non-transitory data storage medium having a computer readable program, wherein the computer readable program when executed on a computer causes the computer to:

construct a second bootable image on a storage medium remotely accessible by the computing system, using a server computer, while the computing system is operating in a first operating environment in association with a first bootable image, wherein the storage medium is not local to the server computer such that the second bootable image is constructed on the storage medium without the second bootable image having to be downloaded from a storage medium local to the server computer onto the storage medium remotely accessible by the computing system;

customize the second bootable image, without using the resources of the computing system, so that the computing system can operate in a second operating environment in association with the second bootable image, when the computing system is directly booted from the second bootable image stored on the remotely accessible storage medium which is sharable with other computing systems;

disassociate the computing system from the first bootable image; and associate the computing system with the second bootable image stored on the remotely accessible storage medium, wherein the constructing, customizing, disassociating and associating are performed by the server computer remotely coupled to the computing system and the storage medium such that the computing system does not perform the constructing, customizing, disassociating and associating so that the customizing is performed by the centralized server without interfering with ongoing operation and functionality of the computing system booted from the first bootable image, while the second bootable image is being constructed, wherein the constructing of the second bootable image is accomplished, without powering down the computing system, by way of at least one of file replacement, file creation, and file modification of constituent file system of the first bootable image for the purpose of activating or deactivating system settings and thereafter configuring runtime parameters associated with the computing system such that the second bootable image includes a file system and constituent configuration data to provide a new operating environment for the computing system, and wherein the disassociating comprises dismounting the computing system from the first bootable image and the associating comprises mounting the computing system on the second bootable image.

19. The computer program product of claim 18, wherein the customizing comprises modifying the second bootable image so that the computing system loads a second operating system to operate in the second operating environment, in response to booting from the second bootable image.

20. The computer program product of claim 18, wherein the customizing comprises modifying the second bootable image so that the computing system operates over a second hardware platform in the second operating environment, in response to booting from the second bootable image.

* * * * *